United States Patent [19]
O'Hagan et al.

[11] 3,737,902
[45] June 5, 1973

[54] COLLISION AVOIDANCE SYSTEM PROVIDING A VECTOR SIGNAL REPRESENTATIVE OF THE DISTANCE AND BEARING BETWEEN A PRIME VEHICLE AND TARGET OBJECT AT A PREDICTED CLOSEST POINT OF APPROACH THEREBETWEEN

[75] Inventors: Robert M. O'Hagan; Joseph F. De Spautz; James E. Carroll, Jr.; Richard H. Sorensen, all of North Plymouth, Mass.

[73] Assignee: State Street Bank and Trust Company, Boston, Mass.

[22] Filed: Aug. 19, 1970

[21] Appl. No.: 65,228

[52] U.S. Cl............343/9, 343/12 MD, 343/112 CA
[51] Int. Cl...............................................G01s 9/44
[58] Field of Search..................343/112 CA, 12 MD, 343/10, 7.3, 9; 340/23

[56] References Cited
UNITED STATES PATENTS

| | | | |
|---|---|---|---|
| 3,137,849 | 6/1964 | Moxley, Jr. | 343/10 |
| 3,265,869 | 8/1966 | Gray | 343/112 CA |
| 3,159,831 | 12/1964 | Muth | 343/112 CA |
| 3,533,060 | 10/1970 | Aker | 343/7.3 UX |
| 3,181,150 | 4/1965 | Ruppersberg et al. | 343/8 |

*Primary Examiner*—Benjamin A. Borchelt
*Assistant Examiner*—G. E. Montone
*Attorney*—Charles Kieken

[57] ABSTRACT

Radar and associated apparatus track the course of neighboring target vehicles and display closest points of approach between the prime vehicle and the target vehicles to signal potential collisions sufficiently in advance to avoid them, may enter a proposed maneuvering change for the prime vehicle into the apparatus, and the apparatus displays whether the proposed change will present any collision situations.

14 Claims, 9 Drawing Figures

FIG. 1

ROBERT M. O'HAGAN
JOSEPH F. deSPAUTZ
JAMES E. CARROLL, Jr.
RICHARD H. SORENSEN
Inventors By Charles Hieken
Attorney

ROBERT M. O'HAGAN
JOSEPH F. deSPAUTZ
JAMES E. CARROLL, Jr.
RICHARD H. SORENSEN
*Inventors*

By Charles Hieken
*Attorney*

COLLISION AVOIDANCE SYSTEM PROVIDING A VECTOR SIGNAL REPRESENTATIVE OF THE DISTANCE AND BEARING BETWEEN A PRIME VEHICLE AND TARGET OBJECT AT A PREDICTED CLOSEST POINT OF APPROACH THEREBETWEEN

BACKGROUND OF THE INVENTION

The present invention pertains generally to a system for use by a vehicle to prevent a collision between that vehicle (prime vehicle) and other target vehicles and, more particularly, relates to a system which is capable of monitoring a plurality of target vehicles and displaying and periodically updating data pertinent to a collision situation.

The problem of preventing vehicle collision as it pertains both to ships and aircraft, has been a long-standing problem. The problem is intensified during periods of low visibility. Collisions of aircraft and ships under radar guidance support a conclusion that radar alone is insufficient to safely guide vehicles along collision-free paths during periods of high traffic density.

It is an object of the present invention to provide a system for avoiding vehicle collisions.

It is a further object of the present invention to provide a collision avoidance system for use on ships or aircraft wherein pertinent collision avoidance data is visually displayed.

It is still a further object of the present invention to provide a visual display of the minimum distance from the prime vehicle to the target vehicle; that is, the "closest point of approach" of the target vehicle.

Still another object of the present invention is to additionally provide means for displaying data relevant to all target vehicles. Such relevant data may include true speed, course and range of each target vehicle with respect to the prime vehicle.

Still another object of the present invention is to provide means for performing an evaluation of the collision potential of a proposed change in prime vehicle velocity.

SUMMARY OF THE INVENTION

According to the invention, means are provided for determining the course and speed of the prime vehicle, means for determining the bearing of and range to a target object, and means for providing a vector signal representative of the distance and bearing between said prime vehicle and each target object at the closest point of approach between the prime vehicle and each selected target object. The system generally includes range and bearing finding means, such as conventional radar, a data processing means, interfacing means coupled to the range and bearing finding means and data processing means and display and interrogation means which are adapted to communicate with the data processing means.

The collision avoidance system, according to an aspect of the invention includes means for tracking a plurality of target objects and retaining data signals characterizing their bearing, speed and range with respect to the prime vehicle while these target objects are within a predetermined range of the prime vehicle. The data processing means includes means for processing the data signals to provide a signal representative of the distance and bearing between said prime vehicle and each target object at the closest point of approach between the prime vehicle and each target vehicle. Preferably, the data processing means also includes means for processing the data signals to provide a time signal representative of the time interval between the occurrence of the present position of the prime vehicle and each target object and the predicted positions of each when at the predicted closest point of approach.

Preferably, there are means for signalling an alarm situation when the closest point of approach of one target vehicle is less than a predetermined value.

The invention may include means for receiving a proposed new prime vehicle velocity signal and means for processing the latter signal and the data signals to provide a corresponding set of CPA signals representative of the closest points of approach forecast with the new prime vehicle velocity.

Alternately the apparatus may receive a new closest point of approach (CPA) that is greater in distance than the one associated with the particular target vehicle of interest and provide an indication of a proposed new vehicle velocity to achieve the new closest point of approach.

According to another feature of the invention, an operator may select individually target vehicle signals of interest for processing according to the invention.

Having now summarized the invention, other objects and advantages of the present invention will be more fully understood when considered in conjunction with the accompanying drawings in which:

DETAILED DESCRIPTION OF PREFERRED EMBODIMENTS

Figure 1:
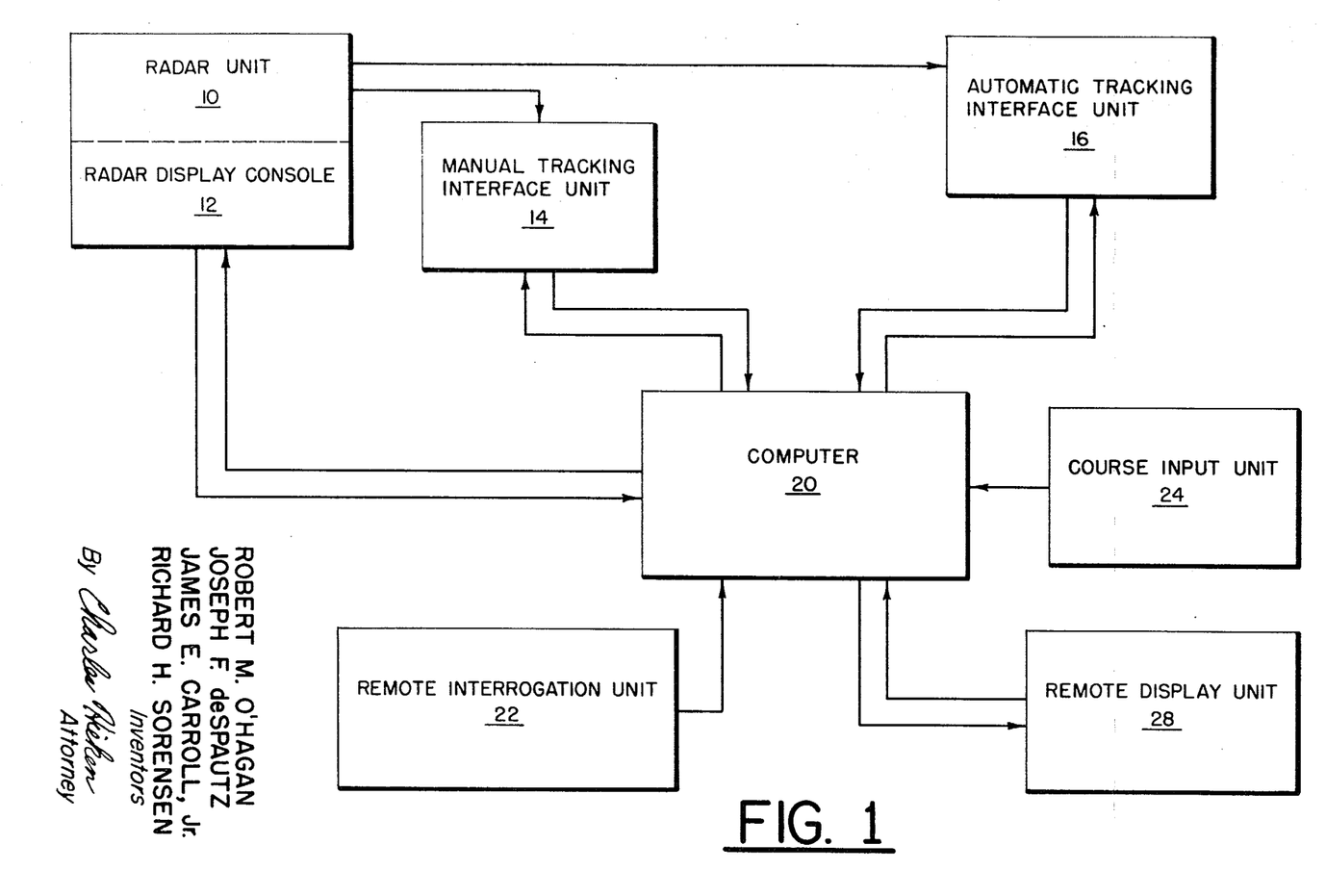
FIG. 1 is a block diagram of the system of the present invention.
Figure 5:
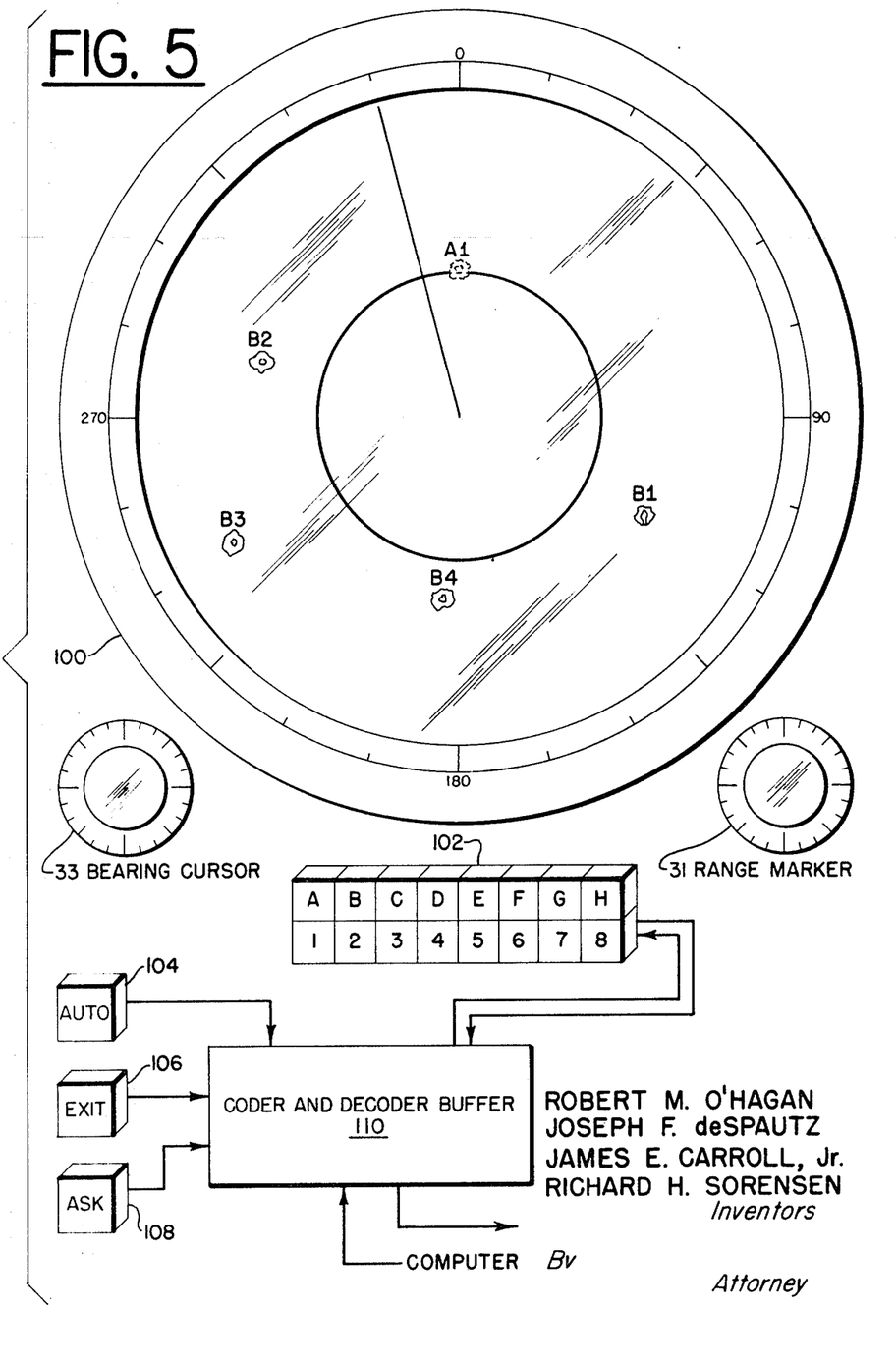
FIG. 5 is a detailed drawing of the radar display console shown in FIG. 1.

FIG. 1 shows a block diagram of the collision avoidance system of the present invention. Closely associated with radar unit 10 or forming a part thereof is radar display console 12, which operates in a manner to permit the entry of target identification data into data processing means such as computer 20 and, in turn, receives target identification data from computer 20. It is by way of radar display console 12 that initial target identification takes place. This console, which is shown in FIG. 5 and which will be discussed in more detail later, also tells data processing means 20 whether a particular target vehicle is to be tracked manually or automatically.

Figure 4:
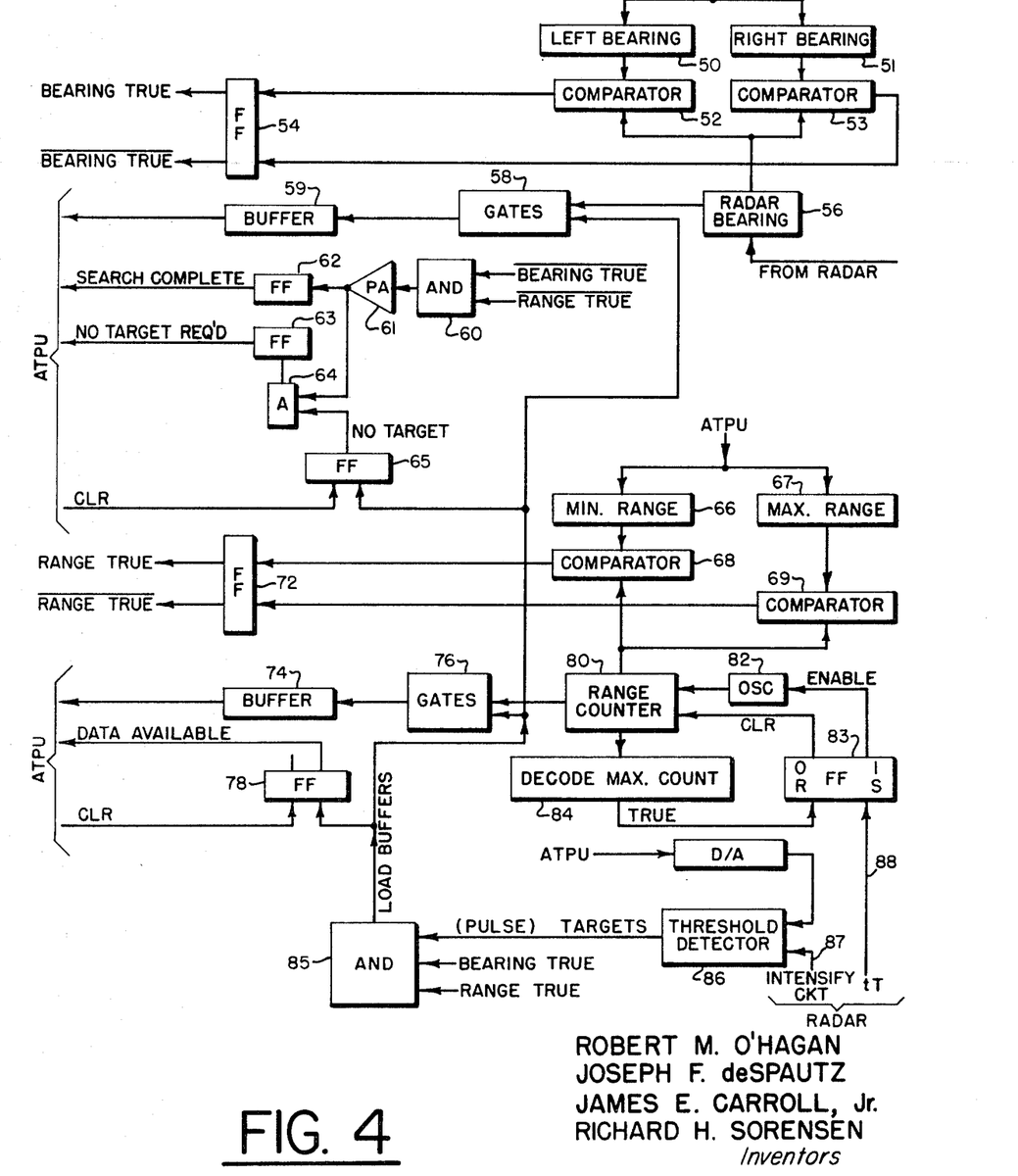
FIG. 4 is a detailed drawing of the automatic tracking interface unit of FIG. 1.

Manual tracking interface unit 14 connects between radar unit 10 and computer 20. It operates to allow the operator of the unit to manually enter target location information into computer 20. Automatic tracking interface unit 16 also connects between radar unit 10 and computer 20. This unit, which is shown in FIG. 4, enables the collision avoidance system to continuously track preassigned target vehicles. The determination as to whether a target vehicle is to be tracked manually or automatically is a human one that is inputed via radar display console 12.

The remaining units shown in FIG. 1 provide for either the display of data or the entry of data to computer 20. Remote interrogation unit 22 is coupled to computer 20. When a course change becomes necessary, data on either a new course or new CPA is entered into Remote Interrogation Unit 22 and from there into computer 20, which process signals to determine if the new course presents any further collision problems. Course input unit 24 provides a signal representative of the ship's own speed and bearing directly into computer 20. This prime vehicle velocity may be entered manually or provided automatically from apparatus such as a gyrocompass and Doppler navigational system.

The remaining unit is remote display unit 28. Computer 20 may provide display signals to remote display unit 28 to display collision avoidance information in a form that a navigator may readily perceive.

Figure 6A:
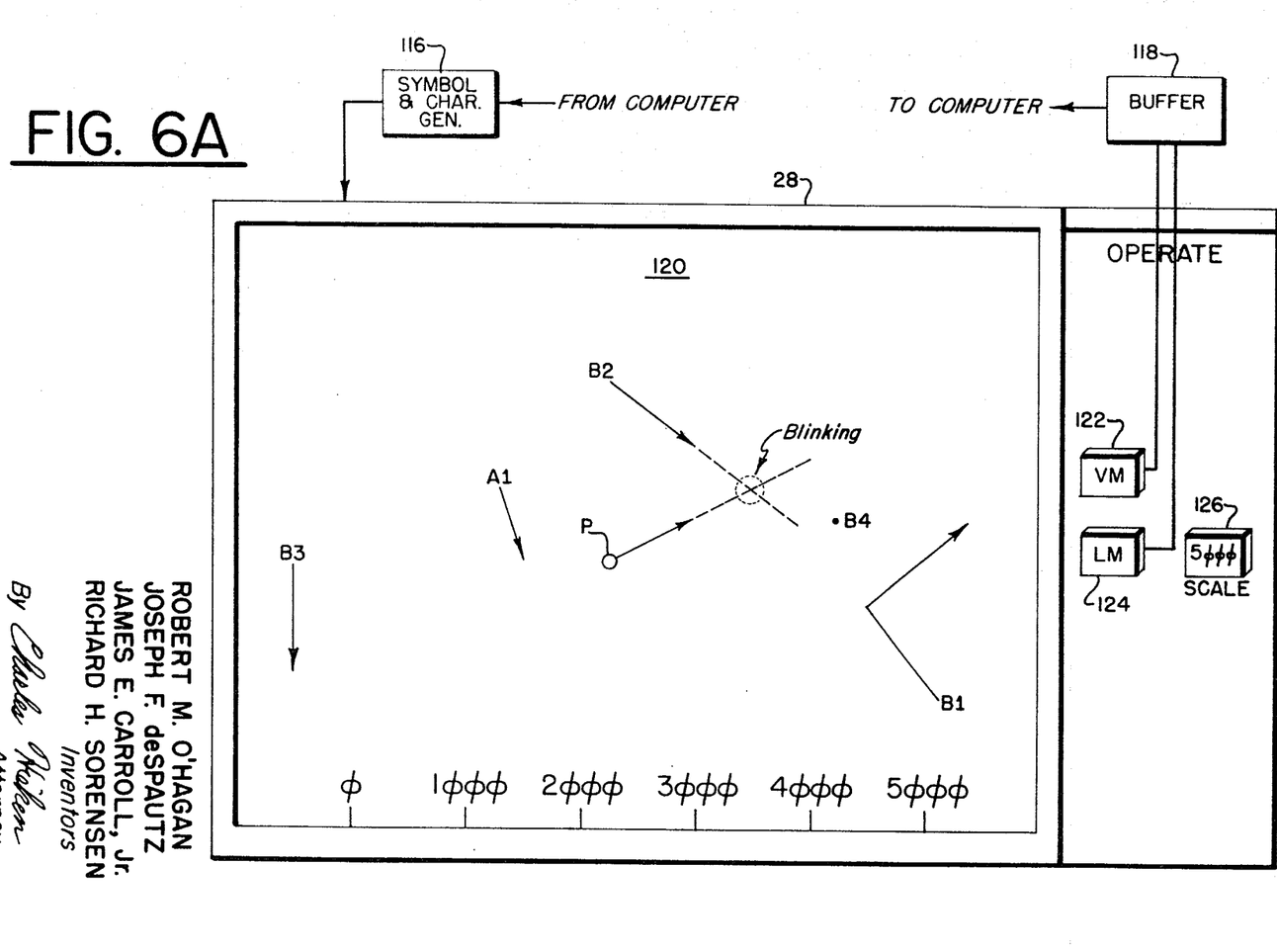
FIG. 6A and 6B show two modes of operation of the remote display unit shown in FIG. 1.

The invention will be better appreciated at this time by briefly considering the nature of displays. Referring to FIG. 6A, there is shown a vector display of the situation. The prime vehicle P is shown at the center of the display with its velocity represented by the direction and length of the vector pointing from it. Five other vehicles designated A1, B1, B2, B3 and B4 are shown with associated vectors representing their velocity. The display is preferably to the scale represented at the bottom of the display in yards or other suitable units so that the prime vehicle P may be seen as being about 1,000 yards from target vehicle A1. The display indicates a predicted collision along the dotted extension path that may be displayed as blinking to bring the attention of the operator to the potential collision so that the prime vehicle may take evasive action. The display also indicates a course change to the right by vehicle B1 from its prior course toward the predicted potential collision point. Note that target vehicle B4 is stationary. This could be, for example, a buoy or lightship instead of a stationary craft.

Figure 6B:
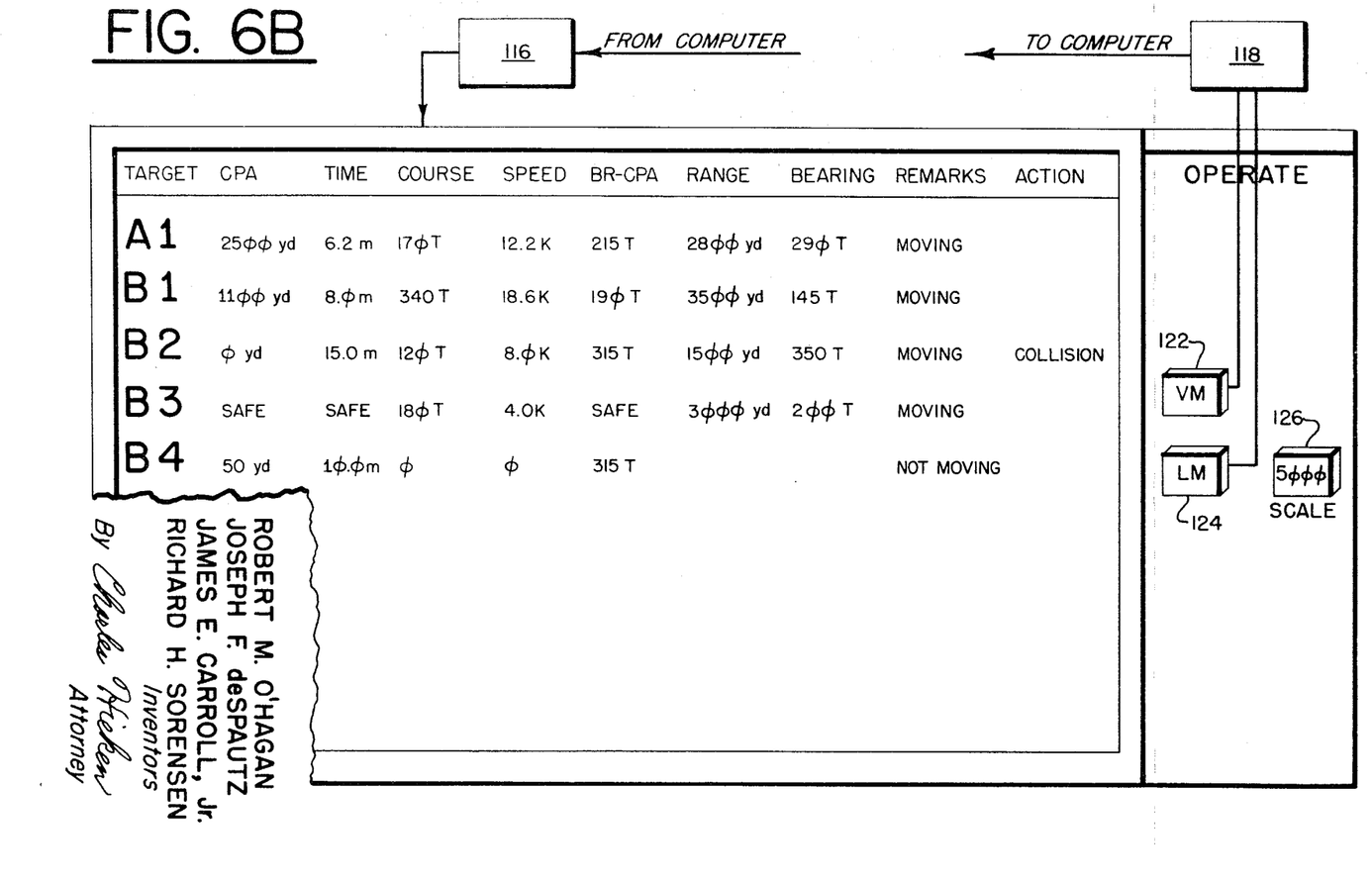

Referring to FIG. 6B there is shown an alternate display in which the vectorally displayed situation of FIG. 6A is set forth in tabular form. How the data signals for providing these displays is obtained will be better understood from the following discussion.

Figure 2A:
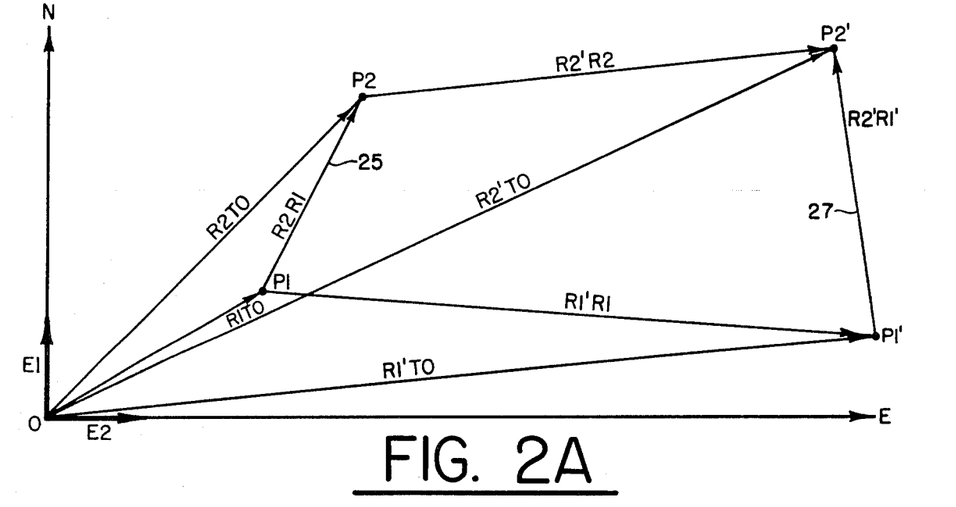
FIG. 2A is a plan view showing the prime vehicle and a target vehicle in a fixed coordinate system, and associated vectors helpful in understanding how the closest point of approach between these two vehicles may be determined.

FIG. 2A is a representation of the positions and velocities of the prime vehicle 25 and the target vehicle 27 at times 1 and 2 helpful in understanding the following mathematical analysis for determining the closest point of approach parameters of the target vehicle to the prime vehicle and when that occurs. In the following analysis it is assumed that the velocity of the vehicles is constant during the time interval between times 1 and 2.

FIG. 2A shows a fixed left-hand coordinate system with the axes labelled N & E for north and east, respectively, and positive angles counterclockwise from the horizontal. E1 and E2 are the unit vectors shown in the coordinate system as commencing at the origin.

Two different instants of time are used in defining the direction of the prime and target vehicles. At time 1, the prime and target vehicles are located at positions P1 and P1', respectively; at time 2, at positions P2 and P2', respectively. With the origin (0) shown at some convenient predetermined location the following vectors can now be defined:

$R1T0$ = true vector position of prime vehicle at time 1;

$R1'T0$ = true vector position of target vehicle at time 1;

$R1'R1$ = vector difference between prime and target vehicle positions at time 1;

$R2T0$ = true vector position of prime vehicle at time 2;

$R2'T0$ = true vector position of target vehicle at time 2;

$R2'R2$ = vector difference between prime and target vehicle positions at time 2;

$R2R1$ = vector difference between positions of prime vehicle at times 2 and 1;

$R2'R1'$ = vector difference between positions of target vehicle at times 2 and 1;

Knowing that the prime vehicle is traveling at a certain velocity $v$, during the time interval $\Delta t$ between times 1 and 2, the following equation can be written:

$$D21 \text{ (distance } P1P2) = v(\Delta t). \tag{1}$$

The following vector equations can now be written with reference to the prime vehicle:

$$R2T0 = R1T0 + R2R1; \tag{2}$$

and the E and N coordinates of the latter term in world dimensions are:

$R2R1 = D21 \cos SBRT$, $D21 \sin SBRT$, respectively, where $SBRT$ is the true course of the prime vehicle.

Vector equations can also be written with reference to the target vehicle, as follows:

$$R2'T0 = R2T0 + R2'R2; \tag{3}$$

and $$R2'T0 = R1T0 + R2R1 + R2'R2. \tag{4}$$

The relative motion of the target vehicle during the time interval $\Delta t$ can be expressed in vector equations also, as follows:

$$R2'R1' = R2'T0 - R1'T0; \tag{5}$$

$$R2'R1 = R1T0 + R2R1 + R2'R2 - R1T0 - R1'R1; \tag{6}$$

and $$R2'R1' = R2R1 + R2'R2 - R1'R1. \quad (7)$$

Figure 2B:
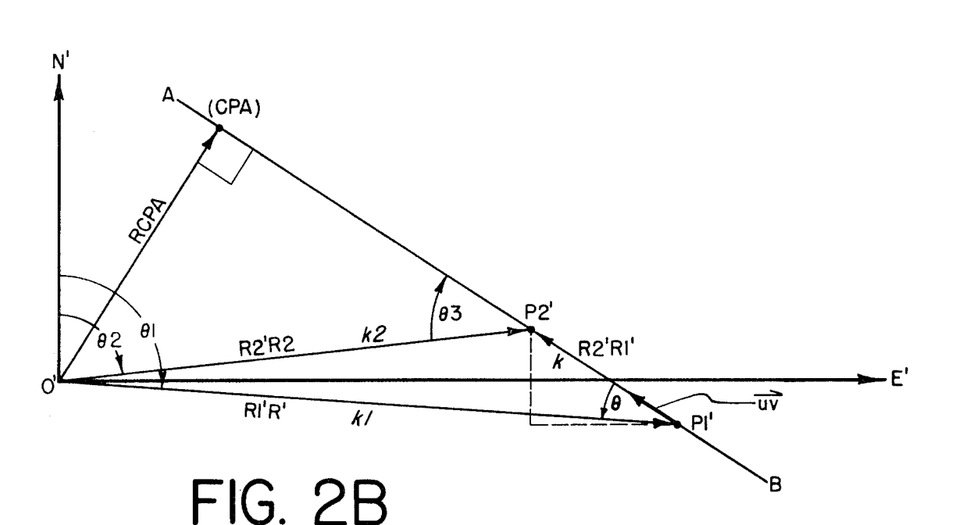
FIG. 2B is a diagram in a moving coordinate system showing the locus of points which indicate the range and bearing of the target vehicle with respect to the prime vehicle.

It is now possible to define a moving coordinate system $(N', E')$, oriented the same as the coordinate system $(N, E)$ but moving along with the prime vehicle. The relative motion of the target vehicle is shown by the vectors originating from the $0'$ origin (center of $N', E'$). The points $P2', P1'$ represent the position of the target vehicle at times 2 and 1, respectively, relative to the prime vehicle at the origin $O'$. FIG. 2B shows the new origin $0'$ and associated vectors.

Line AB shown in FIG. 2B represents the locus of points indicating range and true bearing of the target vehicle with respect to the prime vehicle, providing neither vehicle changes velocity. The CPA (closest point of approach) is the length of the vector RCPA, which is perpendicular to Line AB. The time of the CPA is the time it takes the target vehicle to reach the point CPA.

Turning now to determining the length of vector RCPA and when the target vehicle reaches CPA, the important vectors shown in FIG. 2B are $R1'R1$, $R2'R1'$ and $R2'R2$, all of which have been previously defined, and RCPA. The components of the vectors shown in FIG. 2B can be written in different forms, each calculable from the other. For example, the polar coordinates of $R2'R2$ are $|R2'R2|$, $\theta 2$ or $K2$, $\theta 2$ and of
$R1'R1$ are $|R1'R1|$, $\theta 1$, or $K1$, $\theta$, where $K2 = |R2'R2|$ and $K1 = |R1'R1|$.

The rectangular coordinates of
$R2'R2$ are $(Y2', X2')$; and of
$R1'R1$ are $(Y1', X1')$
where
$$Y2' = K2 \cos\theta 2; \quad X2' = K2 \sin\theta 2 \quad (8), (9)$$
$$Y1' = K1 \cos\theta 1; \quad X1' = K1 \sin\theta 1 \quad (10), (11)$$

If
$$K = |R2'R1'|$$
in the moving coordinate system then,
$$K = [(Y2'-Y1')^2 + (X2'-X1')^2]^{1/2} \quad (12)$$

The polar coordinates of
$R2'R1$ are the range $K$ and bearing $\theta$
with
$$\theta = \tan^{-1}(X2-X1/Y2-Y1); \quad (13)$$
or
$$\theta = \tan^{-1}(k\sin\theta/k\cos\theta). \quad (14)$$

Another form of expressing orthogonal coordinates of the vector $R2'R1'$ is as $k\cos\theta$ and $k\sin\theta$,
$$R2'R1' = (k\cos\theta, k\sin\theta)$$

A unit vector ($uv$) from point $1'$ to $2'$ along line AB has orthogonal components $\cos\theta$ and $\sin\theta$.

The distance from the point $P2'$ to the point CPA along line AB can then be given as;
$$CPA-P2' = -(Y2' \cos\theta + X2' \sin\theta) \quad (15)$$

which is the dot product of the vectors $-R2R2'$ and $uv$.

The angle between the unit vector $uv$ and the vector $(-R2R2')$ can be expressed as:
$$\theta 3 = \cos^{-1}[CPA-P2'/K2] = \sin^{-1} |RCPA|/(K2). \quad (16)$$

The length of the vector RCPA can thus be expressed as:
$$|RCPA| = K2 \sin\theta 3, K2 \text{ being the range to point } P2'$$
from the origin of the moving coordinates.

The distance $K$ from point $P1'$ to $P2'$ is traversed in the time interval $\Delta t$. Thus, the relative speed ($R.S.$) of the target vehicle with respect to the prime vehicle is expressed as
$$R.S. = K/\Delta t. \quad (17)$$

In terms of a physical situation, $K2'$ is the range from the prime vehicle to the target vehicle at time 2 as might be measured by radar. The angle $\theta 3$ is the sum of the bearing to the target vehicle at time 2 as might be indicated by radar plus the supplement of the true course of the target corresponding to the angle of vector $R2'R1'$.

The time of closest approach from time 2 is
$$(DCPA/R2'R1') \Delta t. \quad (18)$$

There are other ways for determining the CPA and its time occurrence suitable for rapid determination with data processing equipment. For instance, using the vector relationships shown in FIG. 2B, one can use the law of cosines to make the determinations. Another technique would be by the use of linear algebra in solving linear simultaneous equations.

For example, applying the law of cosines, the magnitude of the vector $R2'R1' = [(R1'R')^2 + (R2'R2)^2 - 2 R1'R'R2'R2 \cos(\theta 1-\theta 2)]$ where $\theta 1$ is the bearing to position $P1'$ and $\theta 2$ is the bearing to position $P2'$. The CPA and time of CPA may then be determined in the manner described above.

It can also be shown by solving a set of linear equations that the CPA distance $= (Y1X2-Y2X1)/K$ where $X1$ and $Y1$ are the $E'$ and $N'$ coordinates, respectively, of the target vehicle at time 1 and $X2$ and $Y2$ are the $E'$ and $N'$ coordinates, respectively, of the target vehicle at time 2 and $K$ is the distance between positions $P1'$ and $P2'$. The distance to go from position $P2'$ to the CPA point $= (K2^2-CPA^2)$, CPA being the CPA distance. The time of CPA may be determined in the manner described above. This approach may be especially advantageous because inverse trigonometric functions need not be determined. Those skilled in the art will be able to determine other approaches for determining the CPA without departing from the principles of the invention.

Figure 3:
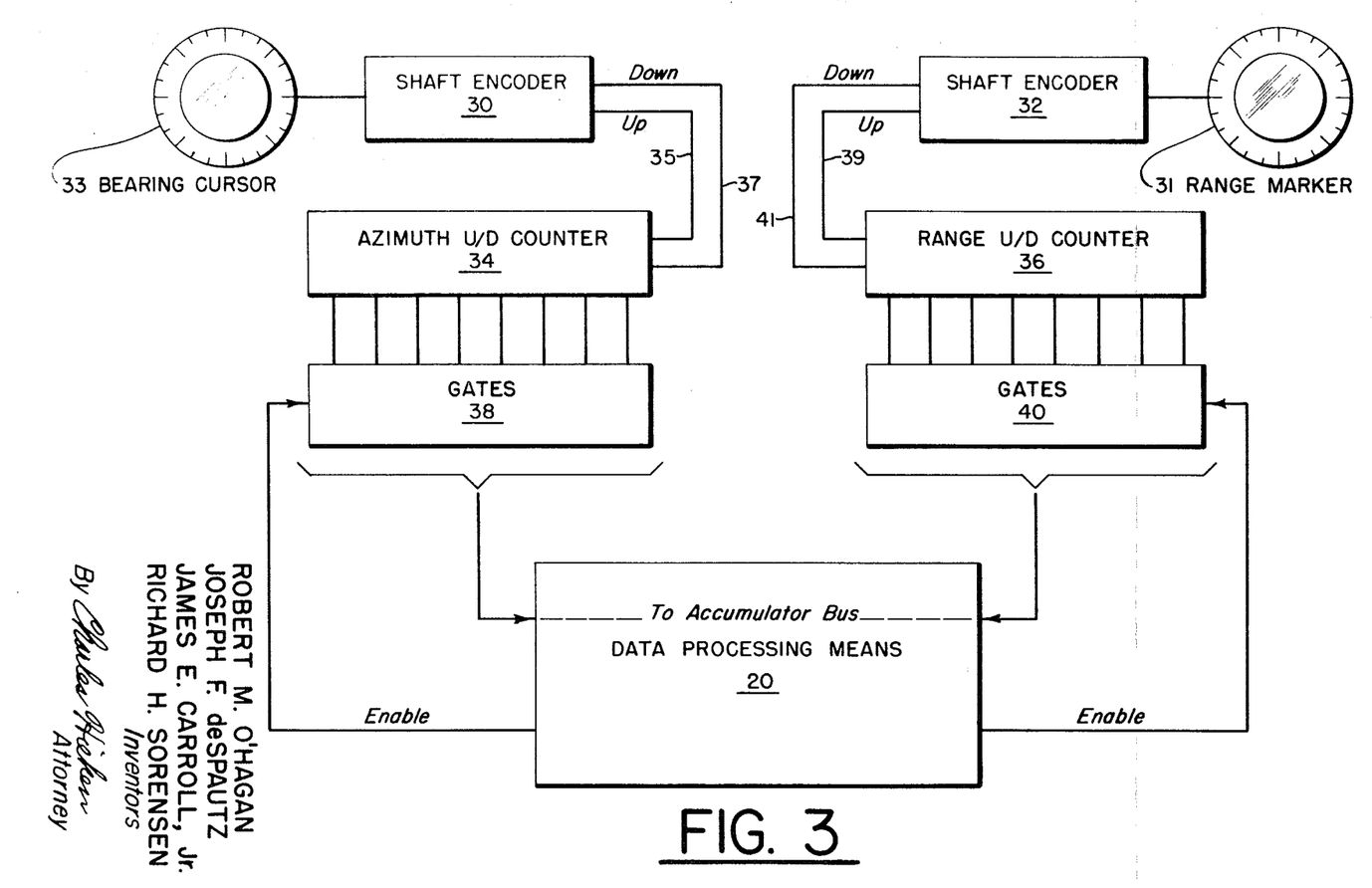
FIG. 3 shows in part the manual tracking interface unit of FIG. 1.

Referring to FIG. 3, there is shown manual tracking interface unit 14. In the manual mode of operation the duty of continually tracking the target vehicle is placed on the radar operator. This is accomplished by periodically aligning the range-marker and the bearing cursor on the target vehicle of interest and depressing the appropriate identifying buttons on the radar display console 12. An operator may thus select specific target vehicles in rain squalls, heavy sea return and very congested harbors.

The conventional radar set usually has manual controls associated with it for determining the range and bearing of target vehicles displayed on the cathode ray tube display. FIG. 5, in particular, shows such a radar display which is of the PPI type. The bearing cursor 31 and range-marker 33 are adjusted until a target vehicle is located. The target is then identified by depressing two buttons, such as the A1 combination, of button array 102. Further discussion on the apparatus of FIG. 5 is taken up hereafter.

Shaft encoders 30 and 32 in FIG. 3 connect, respectively, to range-marker and bearing cursor. These shaft encoders are adapted to convert mechanical shaft positions into electrical signals which are coupled to up/down counters 34 and 36, indicating to these respective counters the bearing to and range of a particular target vehicle then embraced by the range-marker and bearing cursor relative to the prime vehicle. These encoders allow the reading position of the range-marker and bearing cursor to be continually encoded in digital form.

As the bearing cursor 33, for instance, is moved, shaft encoder 30 detects the mechanical movement and sends pulses along line 35 to increase the count of azimuth (up/down) counter 34, or along line 37 to decrease the count of counter 34. Similarly, shaft encoder 32 sends pulses along line 39 to increase the count of range (up/down) counter 36, or, in the alternative, along line 41 to decrease the count of counter 36. At the appropriate time when the target vehicle is located and the count in both counters is therefore stabilized, a signal, originating from radar display console 12, enables both gates 38 and 40. Gates 38 connect to the output of counter 34, whereas gates 40 connect at the output of counter 36. The contents of these counters are transferred to the accumulator bus (not shown) of data processing means 20 in response to the enable signal from the latter for processing to provide collision avoidance information.

Referring to FIG. 4, there is shown the automatic tracking interface unit 16. With the use of unit 16 any target vehicle can be tracked automatically after it has been defined by the radar operator. This is accomplished by depressing the AUTO button 104 (see FIG. 5) after the operator has inserted location and identification data on the target vehicle. If a target is being presently tracked by manual means, it can be automatically tracked by depressing the AUTO button after the appropriate target identification or tag buttons of button array 102 have been depressed to tag the selected target then at the intersection of the cursor bearing and range markers with an identifying letter-numeral tag. Any target that is no longer of interest to the operator may be deleted by depressing the identifying two tag buttons and the exit button located on radar console 12.

Referring to FIG. 4 again, unit 16 receives bearing, timing and target acquisition data from radar unit 10 and also accepts sector scan signals from data processing means 20.

Sector scan signals are related to the position and velocity of each target vehicle. The sector scan signals associated with each target vehicle define an area about the target vehicle having bearing and range bounds within which the target vehicle should be located. The data processing means 20 is adapted to sequentially send sector scan signals to unit 16 in the form of a range interval and a bearing interval. When the search for one target vehicle is completed, data processing means 20 then sends the next sector scan signals to unit 16 for target identification. The data processing unit 20 stores the new location received for each target vehicle, if one is received, selected for automatic tracking.

Unit 16 receives sector, bearing and range signals from data processing means 20 and range and bearing signals from radar unit 10 associated with echo signals. The apparatus then determines whether a target vehicle has been identified within the bounds of the particular sector, and feeds signals representative of the exact bearing and range of the target to data processing means 20. This information may be updated once on each radar scan, typically every six seconds, in one embodiment.

Automatic tracking of radar targets is known in the art, and any of the known techniques may be used within the principles of the invention. The following is by way of example only. For a particular sector area wherein a target is being tracked, left bearing register 50 and right bearing register 51 may receive left and right limit signals, respectively, defining the angular limits of the sector to be scanned. For example, left bearing and right bearing registers 50 and 51 might contain counts of 260 and 265, respectively. In a similar manner, minimum range register 66 and maximum range register 67 may receive short and long limit signals, respectively, defining the radial limits of the sector to be scanned. For example, minimum range and maximum range registers 66 and 67 might contain the counts of 180 and 190, respectively. Together, these left, right, short and long limit signals define an arcuate annular sector.

At time $t_T$, radar unit 10 generates both a search pulse and a logic level pulse $t_T$ that is impressed on line 88. Thereafter, radar unit 10 receives a return echo from a target vehicle at a time relative to $t_T$ proportional to the distance between the target and radar unit. The $t_T$ pulse on line 88 sets flip-flop 83 to enable oscillator 82 to deliver pulses counted by range counter 80. The count accumulated in range counter 80 is proportional to the time elapsed since time $t_T$ and is therefore proportional to the range of a target whose echo is then being received.

Radar units typically scan to a maximum range. This maximum range is detected by decoder 84, which resets flip-flop 83, and in turn clears the range counter 80 to a zero count. This process cyclically repeats and commences on each $t_T$ pulse.

At some time after $t_T$, if a target vehicle is in the appropriate sector area, a return echo signal is detected on line 87. Threshold detector 86 is adjusted to detect only return echo signals large enough to be of interest. If the target vehicle is one that has been previously identified, a return signal should be received indicating that the target vehicle is located within the sector defined by limit signals in registers 50, 51, 66 and 67.

Radar unit 10 defines a radar bearing signal to radar bearing register 56 representative of the bearing of the radial then being searched. When the radar bearing signal in register 56 is the same as the left limit signal in register 50, comparator 52 provides a comparison signal that sets flip-flop 54, thereby indicating entry on the left limit of a sector that should include a target vehicle. In a similar manner, range counter 80 at some time reaches a count that is the same as that contained in minimum range register 66. Comparator 68 then provides a compare signal that sets flip-flop 72, thereby indicating entry on the minimum range of a sector.

The setting of both flip-flop 54 and flip-flop 72 indicates entry into a target sector. If threshold discriminator 86 then provides a target pulse in response to an echo pulse on line 87, AND gate 85 is enabled to provide a load buffer signal. The latter signal enables gates 58 and 76 to load the respective buffers 59 and 74 from the respective counters 56 and 80 with the bearing and range signals associated with the target. The load buffers signal from AND gate 85 also sets flip-flop 78 to signal data processing means 20 that data signals are available identifying the current range and bearing of the target of concern. Data processing means 20 provides a clear signal that resets flip-flop 78 after receiving these data signals.

The load buffer signal from AND gate 85 also sets flip-flop 65 to enable one leg of AND gate 64. The clear signal from data processing means 20 also resets flip-flop 65 to disable AND gate 64 and prevent a no target signal from being provided.

When the search is complete within a particular sector, the following occurs. The radar bearing in register 56 equals the right limit signal in register 51. Comparator 53 then provides a compare signal which resets flip-flop 54. Also, when radar range counter 80 reaches a count that is equal to the long limit count in register 67, comparator 69 provides a compare signal which resets flip-flop 72. AND gate 60 is then enabled to provide an output that sets flip-flop 62 through pulse amplifier 61, indicating that the search is complete with respect to that particular target sector.

If no target was located within the particular sector, threshold discriminator 86 would not have received any pulse via line 87, and AND gate 85 would not have been activated. Flip-flop 65 would, therefore, remain reset, AND gate 64 would be enabled, and flip-flop 63 would have an output that indicates that no target was detected during the particular sector scan. This "no target" signal would be fed to data processing means 20 with the output of flip-flop 62 to indicate that the search is complete for that target vehicle without locating a vehicle in the sector.

Referring to FIG. 5, there is shown the radar display console 12. It includes a series of illuminable push button switches a PPI display 100 and a buffer 110. The range-marker selector 31 and bearing cursor selector 33 are shown as knobs which can be rotated by the radar operator to intensify the brightness at selected range and bearing to produce the range marker ring and bearing cursor line, enabling him to locate a particular target vehicle at the intersection of the ring and line. Each target is represented by a number and a letter as shown on the display 100.

There are connections made from the button array 102, AUTO button 104, EXIT button 106 and ASK button 108, all of which are coupled to coder/decoder buffer 110. Buffer 110, which couples to data processing means 20, is adapted to code signals from the various buttons which are subsequently sent to data processing means 20, and to interpreting coded signals from data processing means 20.

In operation, insertion of the range and azimuth is automatically accomplished after the bearing cursor line and rangemarker ring intersect on the target vehicle. This is accomplished by depressing the glow buttons after the target vehicle has been located at the intersection of the range marker ring and bearing cursor line. For example, suppose that there are six targets within the scope of the radar. The operator might want to identify them as target vehicles A1 through A6. The range-marker 31 and bearing cursor 33 are manually adjusted to locate each vehicle in sequence and provide the initial target location to data processing means 20 through manual tracking interface unit 14. Each target is tagged in sequence by depressing an appropriate pair of glow buttons of button array 102 to tag the target say, A1, then at the intersection of the range marker ring and cursor bearing line.

The tag, bearing and range signals are transferred through buffer 110 to data processing means 20. If AUTO button 104 is also then depressed, this particular tagged target vehicle will be tracked automatically through automatic tracking interface unit 16. Automatic tracking of a particular target may be ended by pressing EXIT button 106 together with the appropriate buttons of button array 102 that correspond to the target tag.

The ASK button 108 is provided to allow the operator to interrogate the apparatus for the identification tag of selected target vehicles that he is tracking on the PPI scope, especially under congested conditions. When the traffic becomes heavy, it is quite likely that the radar operator will be unable to keep track of all targets and their identification numbers. By depressing ASK button 108, however, with range ring and bearing cursor intersecting over a target vehicle, the apparatus may illuminate those of glow buttons 102 corresponding to the tag of that particular target. If the target vehicle in question is not being tracked by the system, no light will appear in button array 102, indicating to the radar operator that no identification has been previously made of the target vehicle under consideration.

The data processing means 20 may be a commercially available digital computer. Since those skilled in the art know how to program such apparatus to process the data signals in the manner described above, programming details are not mentioned herein to avoid obscuring the principles of the invention.

In addition to the range and bearing signals, typically provided by a radar system aboard the prime vehicle, the data processing means 20 preferably receives signals characteristic of speed and course of the prime vehicle. Typical sources of such signals may be Doppler or inertial navigation systems, pitometers, gyrocompasses, or a manually inserted signal determined through known navigation techniques.

Speed corrections for precise determination may include acquiring transmission corrections for local water speed of sound from such devices as a velocimeter or temperature salinity measuring instrument.

The data processing means 20 may provide data signals characteristic of the following: (1) the closest point of approach (CPA) of any target vehicle; (2) the time in minutes before the CPA of any target vehicle; (3) target vehicle's true speed and course; (4) target vehicle's present bearing and present range; and (5) the true bearing of the target vehicle at the time of the CPA. This information may presented in various forms by data processing means 20, such as pictorially, printed out or displayed alphanumerically on a display screen.

Referring to FIGS. 6A and 6B, there is shown remote display unit 28 for vector and list modes of operation, respectively. The character and symbol generator 16 processes the output information signals in a known manner so that they can be displayed on the display screen 120. The character and symbol generator may actually form a part of the data processing means 20. The outputting display 120 may be a cathode ray tube (CRT), a gas tube display, teletype unit, or other suitable display line printer. FIGS. 6A and 6B show a CRT display.

FIG. 6A shows a display for the vector mode of operation. The depression of vector button 122 signals data processing means 20 to display the situation vectorally. The speed and tag of each target vehicle are indicated alphanumerically; the course, by a line arrow on the face of the display pointing along the vehicle course direction. The prime vehicle is usually at the center. All impending collision situations are displayed by dotted lines projected out to the predicted point of impact. The dotted lines may blink to attract the attention of the operator. True course and speeds may be continually updated every six seconds for every target vehicle when used with a typical shipboard radar. Course changes and speeds of other vessels are instantly shown vectorally, thus indicating the probable maneuvering intent of the other target vehicles.

Referring to FIG. 6B, for the list mode of operation the list button 124 is depressed to provide a signal transmitted through buffer 118 commanding data processing means 20 to list the present situation. The system alphanumerically displays each target tag, the location of and time to the then predicted CPA, and its true speed and course. The present true bearing and range of each target is continuously updated every six seconds. All dangerous CPA's may blink on and off to attract the attention of the viewer. Also, after a target vehicle has passed a CPA, the word "safe" may be displayed as shown in FIG. 6B. A remark section of the display may also be provided to indicate certain action that should be taken or other information.

Figure 7:
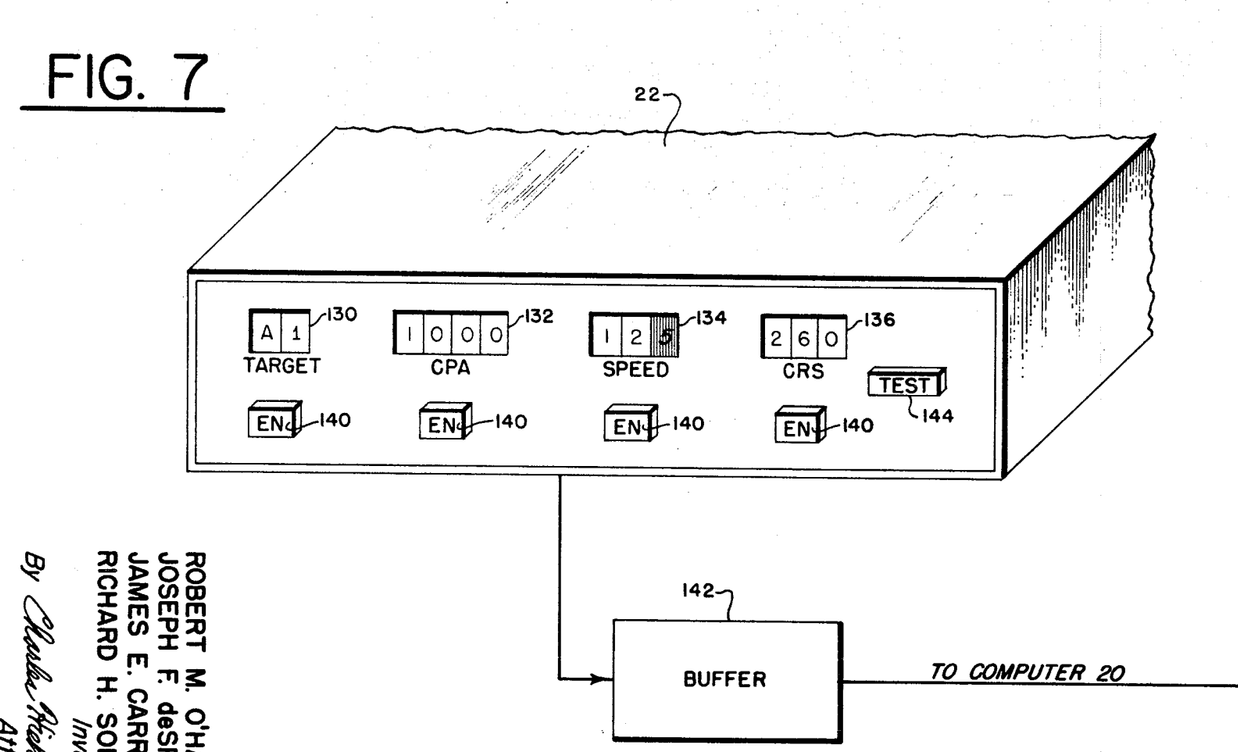
FIG. 7 is a detailed drawing of the remote interrogation unit shown in FIG. 1.

Referring to FIG. 7, there is shown remote interrogation unit 22. This unit allows the operator to select a target vehicle which is to be involved in a dangerous collision situation for immediate evaluation concerning new course changes or new CPA's, before the prime vehicle is maneuvered. The method in which unit 22 operates is the following. The operator selects the target vehicle that he desires to avoid by setting appropriate ones of the thumb wheel switches on the interrogation unit. The operator has the option of either selecting a desired CPA from a selected target or proposing a new course and/or speed to avoid a potential collision. He chooses the first option by setting thumb wheel switches 130 to the tag of the selected target and thumb wheel switches 132 to the proposed new CPA in yards and pressing the associated ones of enter buttons 140. He selects the second option by setting one or both of thumb wheel switches 134 and 136 to the new proposed velocity and pressing the associate one or ones of enter buttons 140.

Upon pressing an appropriate one of ones of enter buttons 140 and test button 144 of the unit, the information is fed into data processing means 20 via buffer 142. Test button 144 is preferably a push-push switch that is illuminated when the apparatus is in the test mode.

Information acquired from remote interrogation unit 22 is processed by data processing means 20, and the new situation is then displayed on remote display unit 28 in either the vector mode or the list mode. The new display shows the recalculated CPA for all target vehicles and any dangerous situation that could develop from the proposed new track of the prime vehicle. If the operator does not choose the proposed new track, he may reset new values in until he is satisfied; or, if he desires to retain the original track, he may repush the test button 144, and the apparatus displays the situation based on actual data.

In the test mode following the second option in which the operator injects a proposed new vehicle velocity, the apparatus is functioning exactly in the manner described above when operating upon actual data signals representative of the actual velocity of the prime vehicle. The only difference is that the proposed vehicle speed and/or course is substituted for the actual value in determining the situation to be displayed.

In the first mode where the operator makes a proposed new CPA distance to a designated target, the data processing means may be programmed to indicate a set of speed-course combinations which will result in the new CPA to the designated target vehicle. The operator could then select a selected one of the combinations for entry with thumb wheel switches 134 and 136 to produce the display of the situation that would result from that new proposed velocity.

Alternately, the operator could select one of course and speed along with the target designation and the proposed new CPA distance to have the apparatus indicate the proposed new other of speed and course and immediately display the situation which would result from having the prime vehicle assume that speed and course. Those skilled in the art may follow generally the techniques described above in determining CPA to determine vehicle velocity; however, the known will be CPA distance while the unknown is prime vehicle velocity.

The specific embodiment described above is useful in avoiding collisions among vehicles at the same level where two dimensional coordinates are adequate to characterize the situation. This specific example has great practical value in avoiding collisions among water surface vehicles or aircraft at the same altitude. The principles of the invention are also applicable to avoiding collisions among vehicles at different levels where three dimensions are required to characterize the situation; for example, in the terminal area around an airport, or where submarines are involved. A simple approach for avoiding collisions under such conditions would be to display the situation of the vehicles only in the azimuth plane and have vehicles follow tracks that avoid intersections with the tracks of other vehicles in the azimuth plane without regard to the altitude of the vehicles.

Alternately, height information signals could be processed in accordance with the principles of the invention and a list of CPA displayed for vehicles in the vicinity of a target vehicle and/or vectorally displayed, it being possible to display situations at different levels on a color display tube in different colors. An especially convenient coordinate system for developing the signals would be cylindrical coordinates $(r,\theta,z)$ with the source of altitude information being any convenient source; for example, altimeter transponders on aircraft, depth transponders on submarines, height finding radar, depth finding sonar, or any convenient source.

The specific example described above contemplated radar on the prime vehicle. However, the principles of the invention are applicable regardless of where the source of prime vehicle data signals originate. For example, this information could be determined from a ground radar system and a situation display determined for each aircraft in the vicinity with means provided for transmitting to each aircraft in the vicinity a display of the situation around it with that vehicle the prime vehicle. The sources of velocity signals may originate from each aircraft in the vicinity determined by, for example, a Doppler or inertial navigator, omnirange, DME, Tacan, or other suitable systems aboard the aircraft. With suitable ground three-dimensional radar, the principles of the invention may be applied to safely control a large volume of airspace while adding negligible additional weight to the aircraft.

An important feature of the invention is that the system (that) may be nonreciprocal; that is, a vehicle may have collision avoidance capability although no other vehicle in its vicinity has it.

There has been described a collision avoidance system characterized by reliability, ease of operation, relatively low cost, great flexibility and provision through means free from complexity for predicting potential new collision situations from a proposed change in the vehicle velocity to avoid a then predicted collision situation. The specific systems and techniques described herein are by way of example only for illustrating the best mode now contemplated for practicing the invention. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Collision avoidance apparatus comprising,
   a source of a signal representative of the velocity of a prime vehicle in a predetermined fixed coordinate system,
   means for providing a target position signal representative of the position of a target object relative to that of said prime vehicle,
   means for providing a target velocity signal representative of the velocity of said target object in said fixed coordinate system,
   and means responsive to the velocity representative and target position signals for providing a vector signal representative of the distance and bearing between said prime vehicle and said target object at the closest point of approach between said prime vehicle and target object were the prime vehicle velocity and target object velocity to maintain the values characterized by the representative signals until said closest point of approach occurs.

2. Collision avoidance apparatus in accordance with claim 1 wherein said signal representative of velocity of said prime vehicle is representative of the actual velocity thereof.

3. Collision avoidance apparatus in accordance with claim 1 wherein said signal representative of velocity of the prime vehicle is representative of a proposed velocity for said prime vehicle.

4. Collision avoidance apparatus in accordance with claim 1 and further comprising means responsive to said *CPA* signal being representative of a closest point of approach that is less than a predetermined distance from said prime vehicle for indicating an alarm condition.

5. Collision avoidance apparatus in accordance with claim 1 wherein said means for providing a target position signal comprises radar means carried by said prime vehicle.

6. Collision avoidance apparatus in accordance with claim 5 and further comprising means associated with said radar means for selecting said target vehicle to provide said position signal as bearing and range signals representative of the bearing and range to said target vehicle from said prime vehicle indicated by said radar means.

7. Collision avoidance apparatus in accordance with claim 1 and further comprising means for displaying a representation of said *CPA* signal to visually indicate the distance from said prime vehicle to said closest point of approach.

8. A collision avoidance system in accordance with claim 6 wherein said means for displaying vectorally displays a representation of said prime vehicle and its velocity and said target object and its velocity.

9. Collision avoidance apparatus in accordance with claim 6 wherein said display means displays the distance between said prime vehicle and said closest point of approach at the time of said closest point of approach.

10. Collision avoidance apparatus in accordance with claim 1 and further comprising,
    means for providing a plurality of target position signals each representative of the position of a target object relative to that of said prime vehicle,
    means for providing a corresponding plurality of target velocity signals each representative of the velocity of a respective target object in said fixed coordinate system.
    and means responsive to the velocity representative and target position signals for providing respective vector signals each representative of the distance and bearing between said prime vehicle and a respective target object at the closest point of approach between said prime vehicle and each target object were the prime vehicle velocity and target object velocities to maintain the values characterized by the representative signals until said closest point of approach occurs.

11. Collision avoidance apparatus in accordance with claim 1 and further comprising means responsive to the velocity representative and target representative and target position signals for providing a time signal representative of the time from the present to the time of said closest point of approach were the prime vehicle velocity and target object velocity to maintain the values characterized by the representative signals until said closest point of approach occurs.

12. Collision avoidance apparatus in accordance with claim 1 and further comprising means responsive to said vector signal for providing a display of said distance and bearing in at least one of alphanumeric values in list form and line vectors.

13. Collision avoidance apparatus in accordance with claim 12 wherein said means for displaying includes means for displaying a real time representation of said prime vehicle and the magnitude and direction of its velocity and that of said target objects.

14. Collision avoidance apparatus in accordance with claim 13 and further comprising means for displaying the resulting positioning of said prime vehicle and target objects of proposed changes in the velocity thereof using projected vectors from their present position while simultaneously showing the current position of prime vehicle and target objects.

* * * * *